United States Patent [19]

Sommers

[11] Patent Number: 5,306,479
[45] Date of Patent: Apr. 26, 1994

[54] PROCESS FOR SYNTHESIZING NIOBIUM DIOXIDE AND MIXED METAL OXIDES CONTAINING NIOBIUM

[75] Inventor: James A. Sommers, Albany, Oreg.

[73] Assignee: Teledyne Industries, Inc. (California Corp.), Albany, Oreg.

[21] Appl. No.: 979,316

[22] Filed: Nov. 20, 1992

[51] Int. Cl.$^5$ ............................................. C01G 33/00
[52] U.S. Cl. ..................................... 423/593; 423/592
[58] Field of Search ................ 423/592, 579, 62, 593

[56] References Cited

FOREIGN PATENT DOCUMENTS 470022 12/1950 Canada ................................. 423/62

OTHER PUBLICATIONS

Wessely et al, *Journal of Applied Physics*, 72(2) pp. 584–591, Jul. 15, 1992.

*Primary Examiner*—Michael Lewis
*Assistant Examiner*—Stephen G. Kalinchak
*Attorney, Agent, or Firm*—Shoemaker & Mattare, Ltd.

[57] ABSTRACT

Niobium dioxide is produced by heating particulate niobium nitride in an oxygen atmosphere at a temperature above the melting point of niobium dioxide. The product obtained predominantly contains niobium dioxide.

3 Claims, No Drawings

PROCESS FOR SYNTHESIZING NIOBIUM DIOXIDE AND MIXED METAL OXIDES CONTAINING NIOBIUM

BACKGROUND OF THE INVENTION

Oxides of niobium and processes for making them and their derivatives have received relatively little attention for use as refractory materials. This is principally because $Nb_2O_5$, the most commonly encountered oxide, is not highly refractory. It melts at 1450 degrees Celsius and suffers considerable loss of oxygen near this temperature. Other oxides of niobium, e.g., NbO and $NbO_2$, have received relatively little attention because they are difficult to prepare. As a result, the use of $NbO_2$ as a novel starting material for any binary and higher-order mixtures with other oxides has not been extensive. Because of this, difficulty there has been limited use of such materials. There is need, therefore, for a better procedure for preparing $NbO_2$ in order to better exploit the use of oxides of niobium and its derivatives.

Heretofore, the obtaining of $NbO_2$ has been achieved in a variety of ways such as the reduction of $Nb_2O_5$ by hydrogen, which reaction is also reversible. Also, by heating $Nb_2O_5$ in a current of argon at 1150 degrees Celsius, the dissociation of the pentoxide is appreciable. For use in X-ray studies, single crystals of $NbO_2$ have been prepared by melting pressed tablets of $Nb_2O_5$ and metal powder, correctly proportioned, in an electric arc furnace.

Niobium dioxide prepared as described is known to have a tetragonal crystal structure as its most common polymorph, a variant of the rutile structure of $TiO_2$ Zircon, $ZrSiO_4$, is also a tetragonal oxide material, which structure is useful in several applications. Therefore, it may be projected useful applications would be found for $NbO_2$ provided it were more directly and economically available.

Due to its complicated electronic structure, it has been used or proposed in such applications as secondary lithium batteries, fuel cell catalyst, photoelectrochemical cell anode, and as a thermochromic material.

Japanese Patent 89-128355 describes the use of $NbO_2$ in batteries which exhibit a high capacity and a long cycle life. The use of $NbO_2$ is also described in PCT number 87-07422 for an interference film component in a magneto-optical recording disk. Some of these uses include $NbO_2$ alone or in combination with other metals or metal oxides. Nevertheless, mixtures of $NbO_2$ with other oxides have not been studied extensively since it is first necessary to produce $NbO_2$ as a powder, then to combine it with another material and heat it to elevated temperatures for prolonged times to generate a new material. There is, therefore, a need for a process which generates $NbO_2$ at a high thermal plateau, so that it can react readily.

PRIOR ART

In the monograph by F. Fairbrother entitled "The Chemistry of Niobium and Tantalum", Elsevier Publishing Co., Amsterdam, 1967, p. 23–25, are given several ways to prepare $NbO_2$:

i) $Nb_2O_5+H_2$ and high temperature, 800° C.–1350° C.;
ii) $Nb_2O_5+$ in argon stream at 1150° C.;
iii) Arc melting of a mixture of $Nb_2O_5+Nb$.

In "Gmelins Handbuch der Anorganischen Chemie", Teil B1, "Niob", #49, p. 33–34, 1970, are listed further methods:

i) $Nb_2O_5+CaH_2$;
ii) hydrogen reduction of alkali metal niobates;
iii) careful oxidation of Nb.

All these methods except the arc melting, have in common that they generate a powder. The arc melting has been conducted on a very small scale for the purpose of generating a few small crystals suitable for single crystal X-ray structure determination. Such specialized methods for producing $NbO_2$ have limited the detailed study of and commercial interest in the material.

It is, therefore, one object of the present invention to provide an efficient, safe, and economical process for preparing niobium dioxide.

It is another object of this invention to provide a process for preparing $NbO_2$ in other than a powdered form i.e. a densified and consolidated form obviating the need of sintering.

It is yet another object of this invention to provide a process for generating $NbO_2$ at a high thermal plateau so that there can be a rapid reaction of $NbO_2$ with other materials mediated by the presence of a liquid phase.

These and other objects are achieved by the present invention directed to novel processes for the synthesis of $NbO_2$ as more fully described herein.

The following are specific examples of the preparation of niobium dioxide and reactions with niobium oxide according to the present invention:

EXAMPLE I

A small quantity of NbN powder, −200 mesh, obtained from the methods described in copending U.S. Ser. No. 721,887 and U.S. Ser. No. 721,884 both filed Jun. 27, 1991 was placed inside a section of open-ended quartz tubing. A stream of oxygen was directed over the NbN powder and a gas torch applied to the underside of the tube for a few seconds. The powder ignited with first a pink, then a brilliant white light and regions were seen to coalesce into molten spherical globules. After cooling, these globules were recovered as consolidated shiny black solids. Surfaces which had been in contact with the quartz were shiny and conformed to the tubing shape. Since the product of ordinary passive air oxidation is a loose, ivory-colored powder of $Nb_2O_5$, it was immediately evident that an unexpected result had been achieved. An X-ray diffraction pattern revealed the solids to be a mixture of $NbO_2$ (tetragonal modification, JCPDS card 9-235), $NbO_2$ (monoclinic modification, JCPDS card 19-859) and $NbO_{1.92}$ (tetragonal, JCPDS 34-672). All of these are reduced phases relative to the expected $Nb_2O_5$.

EXAMPLE II

NbN (1.00 g) and $ZrO_2$ (1.00 g) were mixed and treated in a manner similar to that in Example I. The sample recovered was partially melted. The X-ray powder diffraction pattern of $NbZr_6O_{17}$ accounted for all but three faint lines. The phase diagram of the system $ZrO_2-Nb_2O_5$ (Phase diagrams for ceramists, FIG. 4457) shows that a temperature of at least 1435 degrees Celsius must have been reached.

EXAMPLE III

A sample of the $NbO_2$ obtained was subjected to heating in air at 1000 degrees Celsius. After 20.5 hours, its weight gain was only 11% of that expected for the conversion of $NbO_2$ to $Nb_2O_5$. This shows the high oxidation resistance of the consolidated product form available from this invention.

SUMMARY OF THE INVENTION

Niobium Nitride (NbN) when heated to a sufficiently high temperature in the presence of a stream of oxygen gas will exothermically react with the oxygen to produce a massive consolidated black product which predominately contains niobium dioxide ($NbO_2$)

DETAILED DESCRIPTION OF THE INVENTION

It has been observed that heating niobium nitride in air will form niobium pentoxide ($Nb_2O_5$). If this oxidation is conducted in passively circulating air, a slow conversion of the niobium nitride occurs producing a yellow colored, voluminous product. If the powdered mass is slowly tumbled during the reaction, glowing areas are observed briefly.

Surprisingly, however, when niobium nitride powder is burned in a stream of oxygen the combustion of the niobium nitride takes a completely different course. Instead of the pink-orange glow of the slow combustion in air, brilliant bursts of white light are observed. In addition, small regions of the powdered mass sinter together to form globules of white-hot liquid. The molten material, when cooled, forms massive, shiny consolidated black chunks. These chunks were found to contain one or more of the forms of niobium dioxide.

Further, it has been discovered that niobium nitride can be mixed with other compounds prior to oxidation as described herein to form products previously only available after extensive ceramic synthesis, i.e. solid state reactions.

The oxidation described herein forms the dioxide at a high temperature or high thermal plateau and in the molten state. Niobium dioxide has a melting point of 1915° C. and at or above this temperature its intimate contact with other reactants can produce a wide variety of mixed oxides. For example, mixing powdered niobium nitride and zirconium oxide ($ZrO_2$) will, under oxygen burning at high temperatures, produce the liquid niobium dioxide which will react with the $ZrO_2$ to form mixed oxide products which are only otherwise available from firing mixtures of the unreactive oxide to produce products by diffusion.

The niobium nitride starting material can be obtained from any conventional process for the production of the nitride. Preferably, the nitride is produced according to the process described in co-pending U.S. patent application Ser. No. 908,787, filed Jul. 6, 1992, of James A. Sommers and Lloyd J. Fenwick, the same inventor as herein, the disclosure of which is incorporated herein in its entirety by reference.

The process of the present invention can be practiced in a manner of different than described herein, it only being necessary for the niobium nitride to be contacted with an atmosphere containing a sufficient concentration of oxygen at a high enough temperature to produce an exothermic reaction and the melt formation of niobium dioxide.

I claim:

1. A method of producing niobium dioxide from niobium nitride comprising the steps of:
   a) providing particulate niobium nitride, and
   b) heating the particulate niobium nitride in a sufficiently oxygen rich atmosphere at a temperature above the melting point of niobium dioxide and high enough to produce an exothermic reaction with subsequent formation of niobium dioxide.

2. The process of claim 1 wherein a pure oxygen atmosphere is directed onto the particulate niobium nitride.

3. A method of producing mixed metal oxides containing at least niobium as one of the metals comprising the steps of:
   a) providing a mixture of particulate niobium nitride and a metal or metal oxide and
   b) heating the particulate mixture to a temperature above the melting point of niobium dioxide in a sufficiently oxygen rich atmosphere to produce an exothermic reaction and niobium dioxide melt formation for a sufficient period of time for the metal or metal oxide to combine with the niobium dioxide produced, and
   c) recovering the mixed oxide formed.

* * * * *